Figure 10:
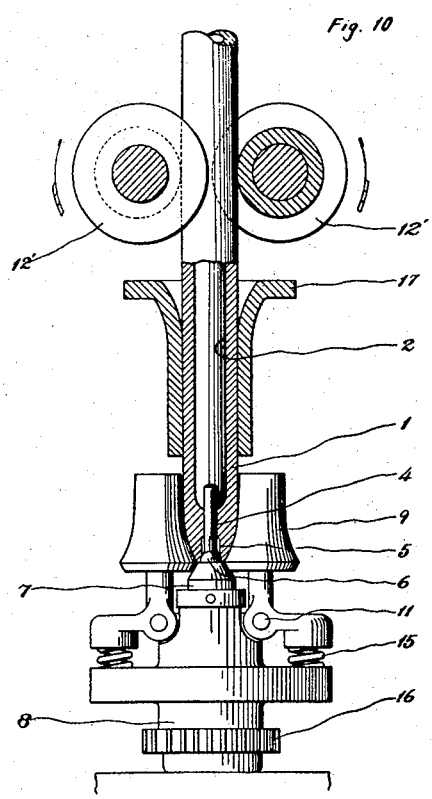

May 31, 1966  TOZABURO NAKADA  3,254,147
METHOD OF MANUFACTURING BALL-PEN POINTS OF SYNTHETIC RESIN
Filed April 16, 1962  4 Sheets-Sheet 1
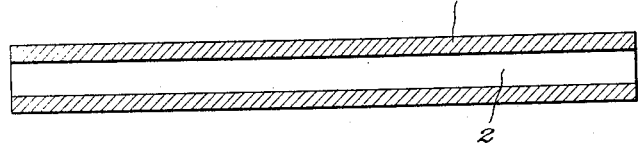
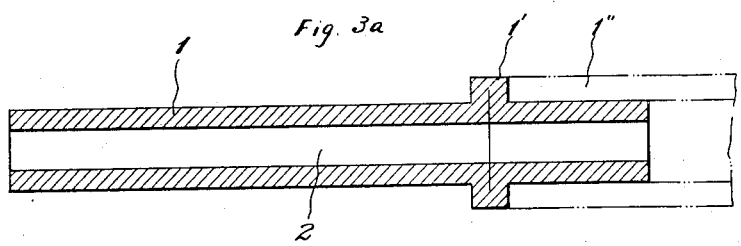
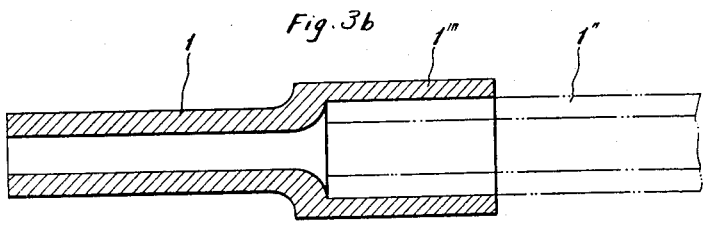
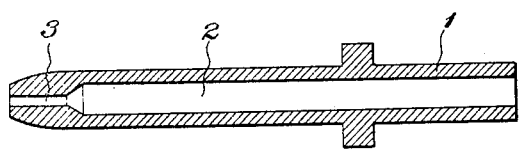
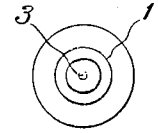
Tozaburo NAKADA
INVENTOR May 31, 1966  TOZABURO NAKADA  3,254,147
METHOD OF MANUFACTURING BALL-PEN POINTS OF SYNTHETIC RESIN
Filed April 16, 1962  4 Sheets-Sheet 2
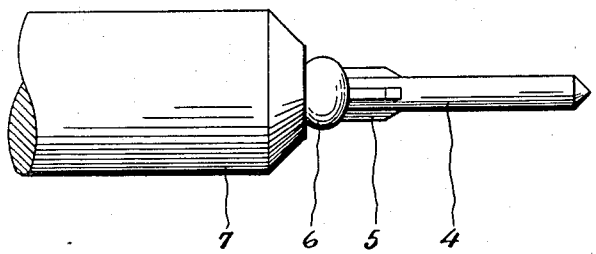
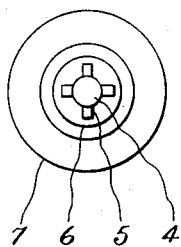
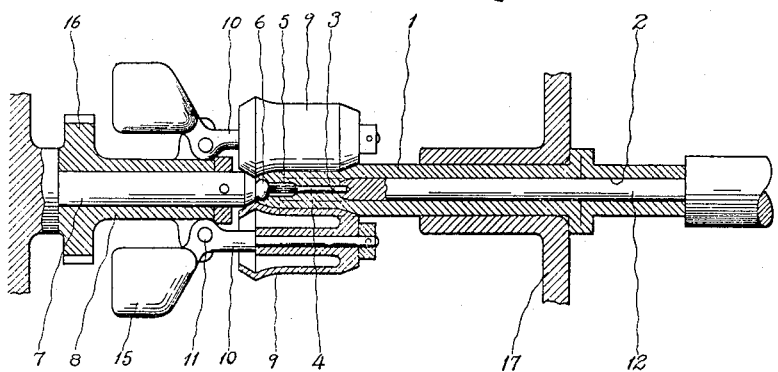
Tozaburo NAKADA
INVENTOR May 31, 1966  TOZABURO NAKADA  3,254,147
METHOD OF MANUFACTURING BALL-PEN POINTS OF SYNTHETIC RESIN
Filed April 16, 1962                                   4 Sheets-Sheet 3
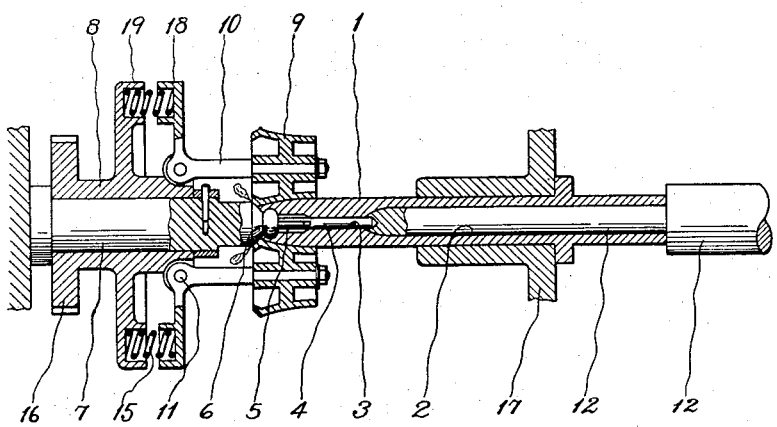
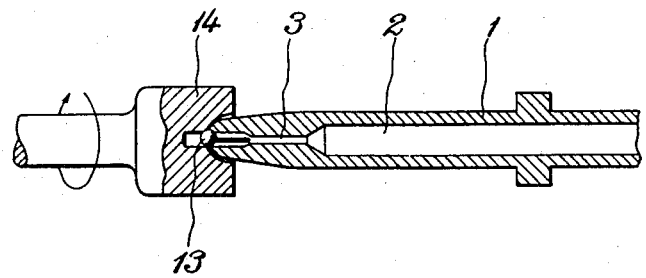
Tozaburo NAKADA
INVENTOR May 31, 1966  TOZABURO NAKADA  3,254,147
METHOD OF MANUFACTURING BALL-PEN POINTS OF SYNTHETIC RESIN
Filed April 16, 1962  4 Sheets-Sheet 4

Tozaburo NAKADA
INVENTOR 3,254,147
METHOD OF MANUFACTURING BALL-PEN POINTS OF SYNTHETIC RESIN
Tozaburo Nakada, 19 Otakimachi, Nakano-ku, Tokyo, Japan
Filed Apr. 16, 1962, Ser. No. 187,758
Claims priority, application Japan, Dec. 29, 1961, 36/48,032; Jan. 26, 1962, 37/2,778
1 Claim. (Cl. 264—242)

This invention relates to a method of mass production of ball-pen points of synthetic resin by molding means.

For this purpose, pipes made of such synthetic resins as nylon, and polycarbonate are used, said plastic pipe being provided with an outlet for ink flow formed at its tip portion. While heating the tip portion of said plastic pipe, a molding pattern for internal precision elements to support a ball in the ball-pen nib is inserted in the tip portion of said plastic pipe which is then compressed from outside so that a ball-support chamber, a flow orifice of ink and guide grooves of ink can be precision molded in said tip portion.

This method can dispense with any procedure of cutting operation but by the sole means of moulding it is made possible to manufacture ball-pen points of high precision in a manner of mass production.

A preferred embodiment of the present method will be explained with reference to the accompanying drawings.

FIG. 1 is a side view of a pipe of synthetic resin partly in section. FIG. 2 is a front view of the same. FIG. 3a is a sectional side view of a plastic pipe which is provided with a flange 1′ to hold an ink pipe 1″ attached to said pipe as shown in FIG. 1. FIG. 3b is a sectional side view of a plastic pipe in which one portion is made as an expanded one 1‴ enable an ink tube 1″ to be inserted therein. FIG. 4 is a longitudinal sectional side view of a plastic pipe which has been molded by means of injection moulding and provided with a slender outlet for ink. FIG. 5 is a plan view of the same, namely, FIG. 1–FIG. 5 show the original material of the present method. FIG. 6 is a side view of a precision mold for molding ball-pen points for current use in the present method. FIG. 7 is a front view of the same. FIG. 8 is a partly sectional side view of an operating apparatus to mold ball-pen points of the present method. FIG. 9 is a partly sectional side view of another embodiment of molding apparatus. FIG. 10 is a partly sectional side view of an apparatus to mold ball-pen points from a long pipe by molding means. FIG. 11 is a sectional view of a compressing tool for the tip to hold a ball.

The material to be used by the present method is a pipe 1 of synthetic resin in FIG. 1 and FIG. 2 or a similar pipe which is further processed as shown in FIGS. 3, 4 and 5, for instance, such a pipe as is provided with a fiange 1′ or an expansive portion 1‴ or a long pipe shown in FIG. 10 or such a pipe as is provided with a hollow portion and an outlet 3 for ink at the tip of said pipe formed by means of injection or other molding.

One type of molding pattern for use by the present method is shown in FIGS. 6 and 7. Reference numeral 4 is a molding pattern for flow-down outlet for ink, 5 for guide grooves for ink and 6 for a ball-support chamber, all these molding patterns being combined in one body by means of a supporting lever 7.

As shown in FIGS. 8, 9 and 10, numeral 1 is the pipe material the tip portion of which is softened by heating and at the same time the molding pattern shown in FIGS. 6 and 7 is inserted therein. In the case of using such a short pipe as shown in FIGS. 1 to 5, a support lever 12 is inserted in the hollow portion 2 of said pipe 1.

In an apparatus shown in FIG. 8, a shaft 10 provided with a roller 9 for free rotation it attached to a rotator 8 by means of a main shaft 11 perpendicular to the axial line of said pipe 1. Said shaft is further provided with a weight 15 in such a manner that when said rotator 8 begins to rotate by means of a gear 16, the roller 9 also begins to revolve due to the centrifugal force of said weight 15, thus compressing the outer circumference of the heated tip portion of said pipe during its revolution and rotation. In the present case, said rotator 8 is provided with more than two rollers of the above-mentioned nature.

In an apparatus shown in FIG. 9 a spring receiver 18 is connected to the shaft 10 of roller 9 and there is provided a spring 15 between said spring receiver and another spring receiver 19 for said rotator 8 so that the roller 9 while rotating can compress the heated tip portion of said pipe 1 due to the resilient force of the spring 15.

In an apparatus shown in FIG. 10 to deal with the use of a long pipe, the same molding operation is applied to the tip of portion of said pipe and then it is cut to suitable lengths.

If any superfluous part of synthetic resin comes to remain at the tip portion of a ball-pen nib after molding operation of the present method, it is naturally necessary to cut it away by means of an additional step.

The compressing operation shown in FIG. 11 will be carried out in cases where the outlet of the ball-support chamber is opened straight as shown in FIG. 10. The ball 13 is inserted in the ball-support chamber and the resin molded over the ball by rotating tool 14.

According to the present invention, simple pipes or similar ones of synthetic resin are used as the pipe material and an integral mold for an ink-flow outlet, ink-guide grooves and a ball-support chamber is inserted in the tip portion of said pipe which is then compressed from outside while being subjected to heating.

Therefore, a simple but accurate molding operation is available for mass production of ball-pen nibs of synthetic resin.

What is claimed is:

The method of forming a ball point pen barrel of a thermoplastic synthetic resin having a ball seated on a spherical surface thereof and ink grooves connecting the interior of the barrel with said surface comprising the steps of forming a tube of said resin, heating the end of the tube while inserting a male mold element formed with a spherical portion and a connected grooved portion into the heated end, rolling the heated resin into firm contact with said mold, removing the mold and seating a ball on the spherical surface formed by the rolling operation, and molding the end of the tube over the ball.

References Cited by the Examiner

UNITED STATES PATENTS

| | | | |
|---|---|---|---|
| 601,902 | 4/1898 | Oliver | 264—249 |
| 1,668,442 | 5/1928 | Wineman | 29—552.4 |
| 1,740,144 | 12/1929 | Barrett | 18—56 |
| 2,169,315 | 8/1939 | Yngve | 264—249 |
| 2,498,009 | 2/1950 | Schrader et al. | 113—52 XR |
| 2,582,383 | 1/1952 | Jones | 264—249 |
| 2,932,890 | 4/1960 | Sporck et al. | 113—52 XR |
| 2,958,898 | 11/1960 | Voumard et al. | |
| 3,128,504 | 4/1964 | Gewecke | 18—36 |
| 3,166,618 | 1/1965 | Fehling et al. | 264—328 |

ROBERT F. WHITE, *Primary Examiner.*

MORRIS LIEBMAN, *Examiner.*

C. B. HAMBURG, F. MARLOWE, L. S. SQUIRES,
*Assistant Examiners.*